(12) United States Patent
Dockery

(10) Patent No.: US 7,121,778 B2
(45) Date of Patent: Oct. 17, 2006

(54) DEVICE TO SECURE CARGO

(76) Inventor: Paul Dockery, 12498 Sleepy Hollow Rd., Duncanville, AL (US) 35456

( * ) Notice: Subject to any disclaimer, the term of this patent is extended or adjusted under 35 U.S.C. 154(b) by 37 days.

(21) Appl. No.: 10/985,567

(22) Filed: Nov. 10, 2004

(65) Prior Publication Data

US 2006/0099046 A1    May 11, 2006

(51) Int. Cl.
*B60P 7/135* (2006.01)
(52) U.S. Cl. ........................................ 410/121
(58) Field of Classification Search ................ 410/121, 410/31, 32, 34, 77, 122, 123, 129, 140, 155
See application file for complete search history.

(56) References Cited

U.S. PATENT DOCUMENTS 3,493,128 A * 2/1970 Silvert ........................ 206/451
4,456,415 A    6/1984 Joice-Cavanagh
5,848,869 A   12/1998 Slocum et al.
6,270,299 B1 * 8/2001 Rehbein ....................... 410/41
2003/0161700 A1  8/2003 Moore

FOREIGN PATENT DOCUMENTS

GB       2363599 A    1/2002
GB       2381827 A    5/2003

* cited by examiner

*Primary Examiner*—H Gutman
(74) *Attorney, Agent, or Firm*—Gregory H. Revera; Bradley Arant Rose & White, LLP

(57) ABSTRACT

The present invention provides a device to secure cargo within the cargo area of a transport vehicle, using a rigid plate and at least one bracing member to maintain the rigid plate upright against the cargo to be secured; and at least one rigid arm to extend from an upper portion of the rigid plate across the top of a portion of the cargo, where the arm is configured to be engageable with at least one retainer.

26 Claims, 4 Drawing Sheets

DEVICE TO SECURE CARGO

BACKGROUND OF INVENTION

The invention relates generally to a new and useful way to secure cargo.

Background Art

During the transportation of smooth cargo in open haul vehicles, cargo tends to shift upon rapid acceleration or deceleration. This is particularly true for cargo such as planed lumber.

The transportation industry has various ways of securing and bracing cargo while in transit. The most common means is the use of flexible straps around the outside of the load which are secured to the bed of the vehicle.

In the case of smooth cargo like finished lumber, friction between pieces of smooth lumber is minimized and lumber has a tendency to slide off the transport vehicle, or conversely the load can slam into the forward portion of the transport vehicle, or even flip over the top of the cab, no matter how tightly one straps it in from side to side. This is especially true for items at the top of the stack, including entire packs of lumber which might be resting on other lower packs.

The inability to securely fasten a smooth cargo load can create a dangerous and hazardous condition as items can slide off the vehicle while in operation, as well as loss of or damage to cargo.

The present invention addresses the need to more firmly secure smooth cargo during operation.

SUMMARY OF INVENTION

In some aspects, the invention relates to a device to secure cargo, comprising a rigid plate and a strut or other strong member which braces the rigid plate.

In other aspects, the invention relates to a device to secure cargo, comprising a rigid plate, a strut or other strong bracing member which braces the rigid plate and a rigid arm that extends from the top of the rigid plate.

In other aspects, the invention relates to a device to secure cargo, comprising a rigid plate, a strut or other strong bracing member which braces the rigid plate, a rigid arm that extends from the top of the rigid plate and a means for securing the rigid arm from movement.

In other aspects, the invention relates to a device to secure cargo comprising a rigid plate, a bracing member which braces the rigid plate, a rigid arm that extends from the top of the rigid plate and a means for securing the rigid arm from movement by use of a fastener on the rigid arm, and retainers which attach to the fastener and can be anchored to the vehicle.

In still other aspects, the invention relates to a device to secure cargo comprising a rigid plate, a bracing member which braces the rigid plate and a rigid arm that extends from the top of the rigid plate where the rigid arm is connected to the rigid plate by a hinge.

Advantages of the present invention include a better method to prevent or retard cargo from sliding forward or backward in transit, especially but not limited to loads at the top of the cargo. Other aspects and advantages of the invention will be apparent from the following description and the appended claims.

DETAILED DESCRIPTION

Figure 1:
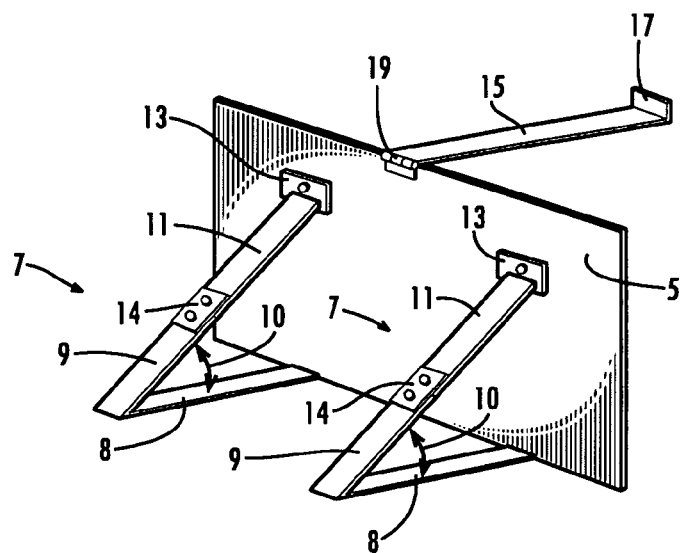
FIG. 1 illustrates a perspective view of the present invention.

The following definitions are provided for a consistent understanding of the invention described. It should be noted that identical features in different drawings are shown with the same reference numeral.

The term "rigid plate" refers to a predominantly two-dimensional structure with some thickness, of low flexibility and sufficient strength to secure a cargo load, which can be flat or have convex or concave portions, and can have a continuous surface or a discontinuous surface with holes or porosity. The rigid plate is preferably made of aluminum, steel or other metal. However, it can also be made of plastic, wood, fiberglass or other material of suitable strength.

The term "brace" or "bracing member" refers to any article of sufficient strength to stabilize and maintain upright the rigid plate against the load to be stabilized. Preferably it is made of aluminum, steel or other metal. However, it can also be made of plastic, wood, fiberglass, cord, bungee cord, a woven strap or other suitable material. It can be an integral part of the rigid plate, or an integral part of the transport vehicle, or at least one separate piece capable of conjoining the rigid plate to the transport vehicle or to objects or cargo on the transport vehicle.

The term "rigid arm" refers to any article of sufficient strength to secure the cargo load. The rigid arm is preferably made of aluminum, steel or other metal. However, it can also be made of plastic, wood, fiberglass or other material of suitable strength.

The term "retainer" means an item which can be used to retain another object relatively securely in place, and can be a strap, rope, cord, or other strong flexible material or strong rigid bar, strut, pole or other configuration; generally the retainer is designed to press against the object to be retained so as to hold it in place, but can also pull from an underside attachment to effectuate the retention of the object.

The present invention, one embodiment of which is illustrated in FIG. 1, uses a large rigid plate 5 to secure either the front end or the back end, or both, of a cargo load. The load is stabilized with at least one bracing element 7 which can be joined to the rigid plate at a junction point 13. In its preferred mode there are two bracing elements 7. In its preferred mode, each bracing element has three sections; a bottom section 8 which can be anchored to or rest upon a fixed part of the transport vehicle, or cargo or other objects on the transport vehicle; a lower hypotenuse section 9 which is attached to the bottom section 8 forming an angle 10; and an upper hypotenuse section 11 which can be joined to the rigid plate at a junction point 13 and is also joined to the lower hypotenuse section 9 by bolts 14 or other suitable connection mechanism.

At least one rigid arm 15 extends from the top of the plate forward over at least a part of the load with a lip or flange or other fastener 17 on the end. In its preferred mode, the rigid arm 15 is hinged 19 to the rigid plate.

Figure 2:
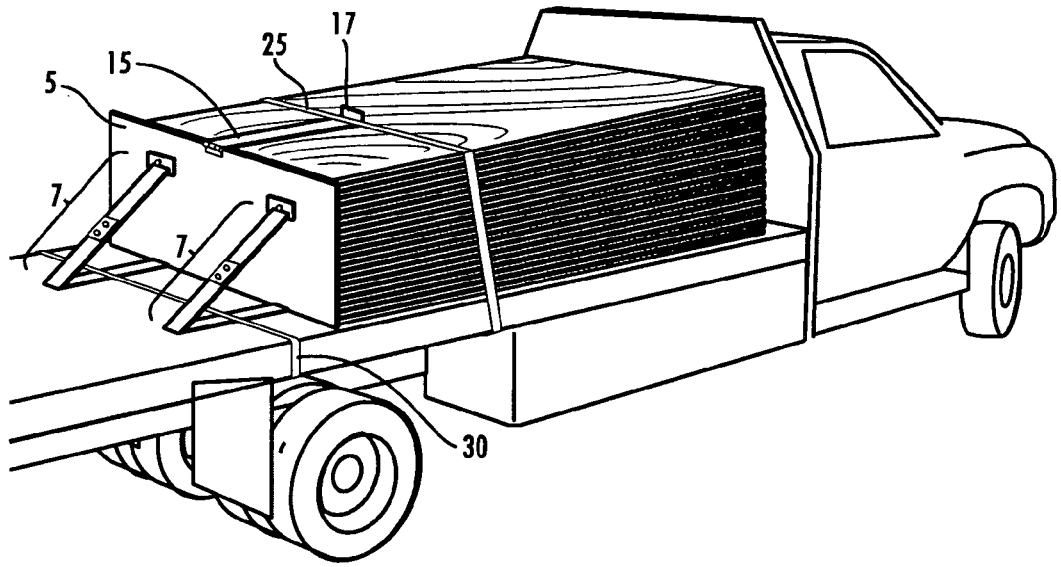
FIG. 2 illustrates a perspective view of the present invention in operation.

FIG. 2 illustrates an embodiment of the present invention in which at least one retainer 25, such as a strap, rope, cord, chain, cable, wire, canvas, tarpaulin or other strong and cargo conformable binder, is placed over the load of lumber (or other cargo), anchored to the truck or flatbed on each side of the cargo or, at least in part, substantially adjacent or beyond the farthest extending portion of the fastener 17 in the direction away from the rigid plate, and securely engaging the rigid arm 15 via the fastener 17. The retainer 25 thus restrains substantial movement of the rigid arm 15, which in turn retains the rigid plate 5 in place. For even better stability, one or more additional retainers 30 can engage the bracing element 7 with the braces resting on or being anchored to a fixed part of the transport vehicle or to cargo or other objects on the transport vehicle, either separately or together with a retainer 30 passing though the bracing element and being anchored to the transport vehicle on each side of the cargo. With the rigid plate 5 in place at the front or rear of the cargo, or in both places, as desired, the cargo cannot slide significantly.

Figure 3:
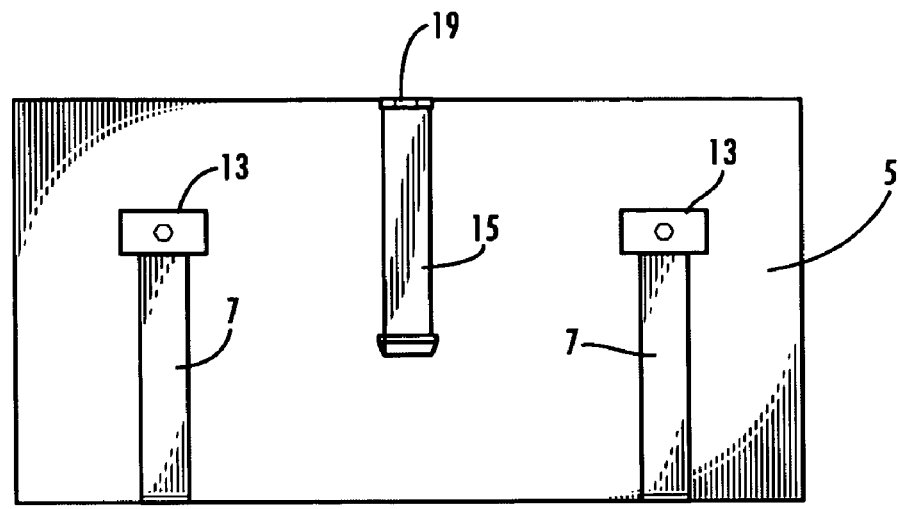
FIG. 3 illustrates an end view of the present invention.

FIG. 3 illustrates an end view of the present invention in which the rigid arm 15 is turned back on its hinge 19.

Figure 4:
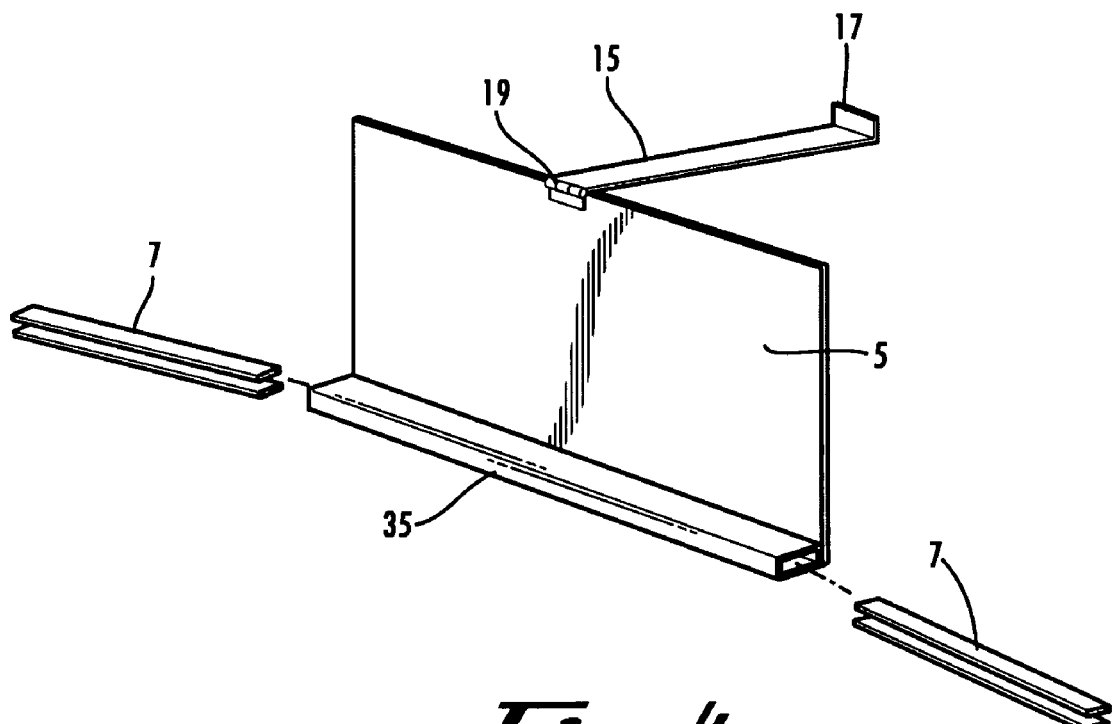
FIG. 4 illustrates an end view of an alternative embodiment of the present invention utilizing a sliding bracing element.

FIG. 4 illustrates an alternative embodiment of the present invention. In this embodiment, the bracing elements 7 slide into and out of the side of the rigid plate 5 from a housing 35 at the base of the rigid plate.

Figure 5:
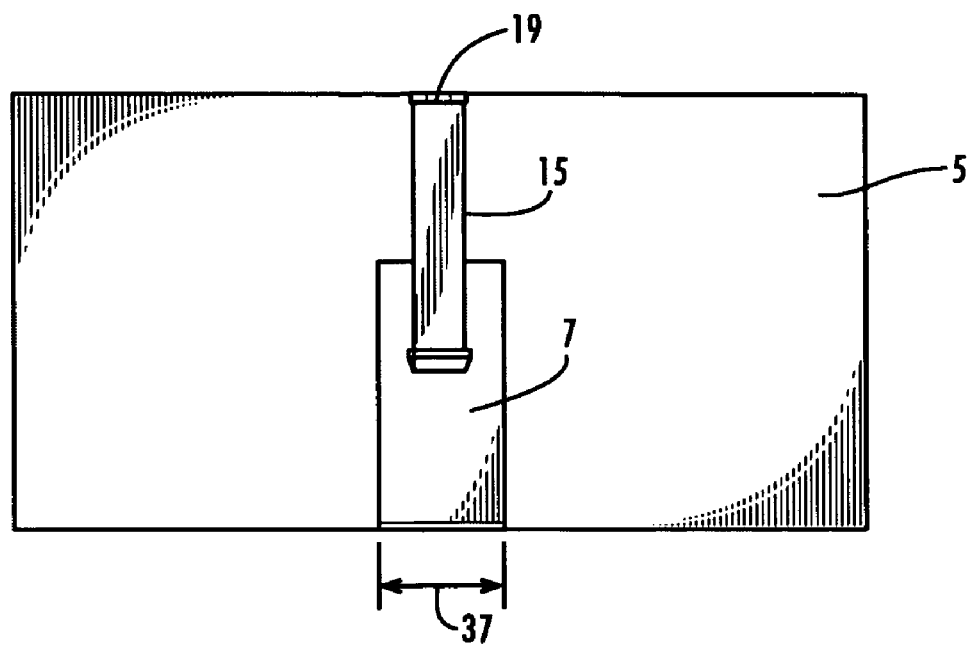
FIG. 5 illustrates an end view of an alternative embodiment of the present invention utilizing a single, wide bracing element.
Figure 6:
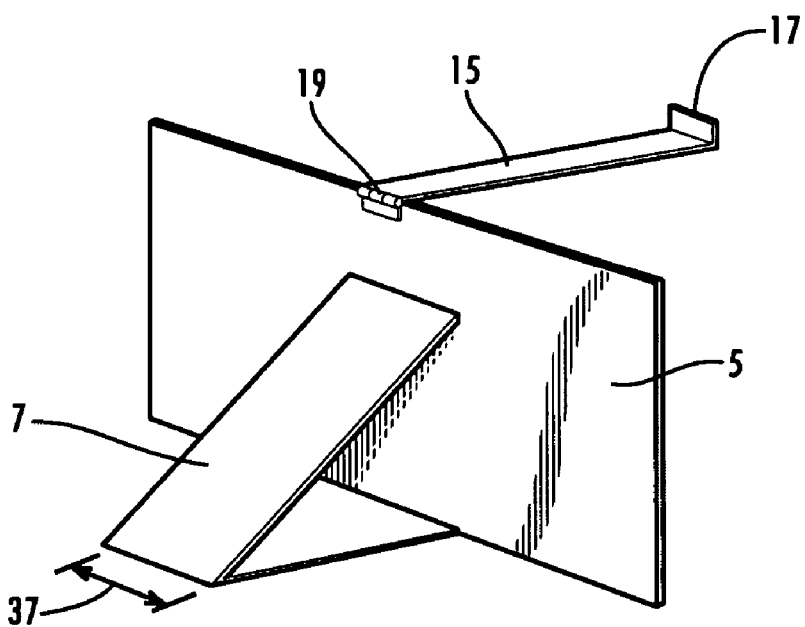
FIG. 6 illustrates an end view of an alternative embodiment of the present invention utilizing a single, wide bracing element.

FIGS. 5 and 6 illustrate an alternative embodiment of present invention. In this embodiment, a single bracing element 7 is used. The bracing element has a wide width 37 and is centered to the rigid plate 5.

Figure 7:
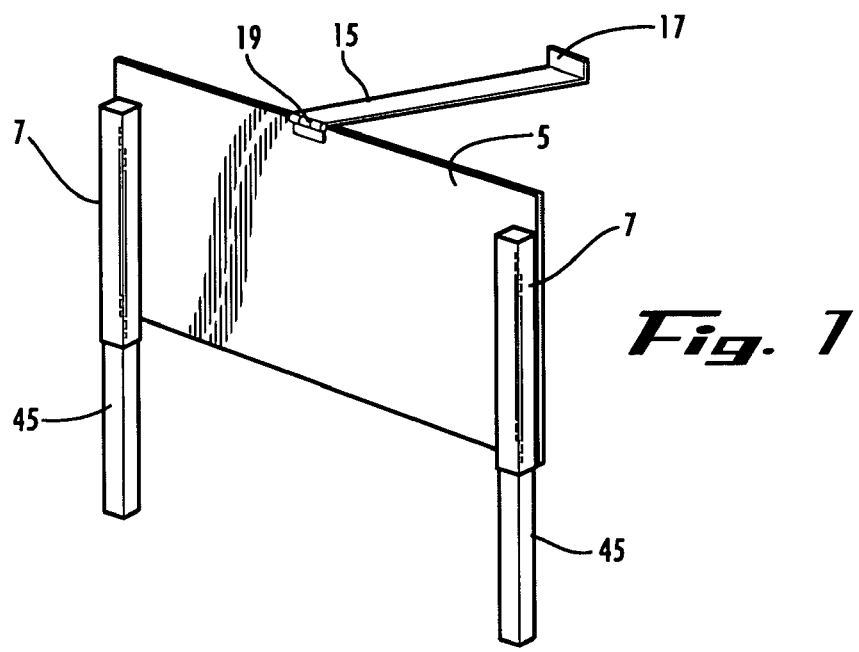
FIG. 7 illustrates an end view of an alternative embodiment of the present invention utilizing bracing elements attached to the edge of the rigid plate.

FIG. 7 illustrates an alternative embodiment of the present invention. In this embodiment, the bracing elements 7 are securely fastened to the edges of the rigid plate 5. The bracing elements slide downward on each side as a receptacle on to posts 45 on the vehicle.

Figure 8:
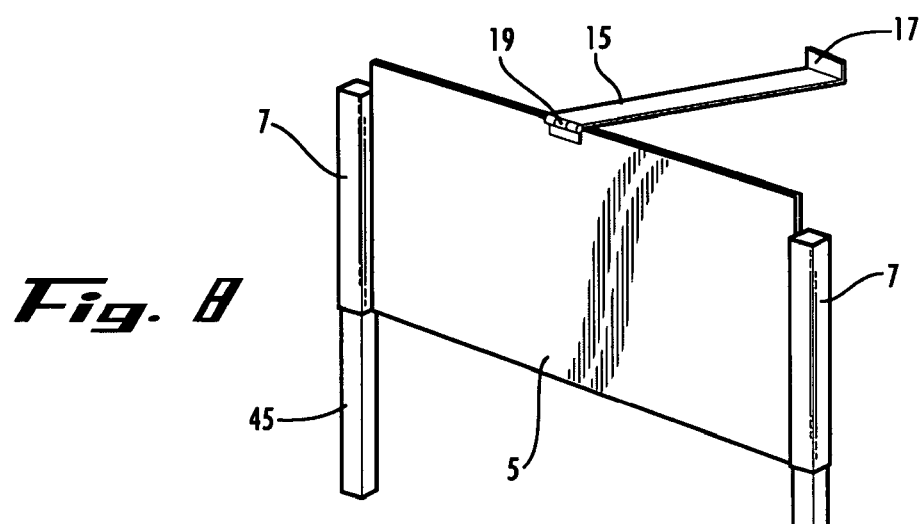
FIG. 8 illustrates an end view of an alternative embodiment of the present invention utilizing bracing elements attached to the edge of the rigid plate.

FIG. 8 illustrates an alternative embodiment of the present invention. In this embodiment, which is similar to the embodiment illustrated in FIG. 7, the downwardly extending bracing elements 7 are offset on each side of the rigid plate so that in use, the bracing elements 7 can straddle lower cargo.

Figure 9:
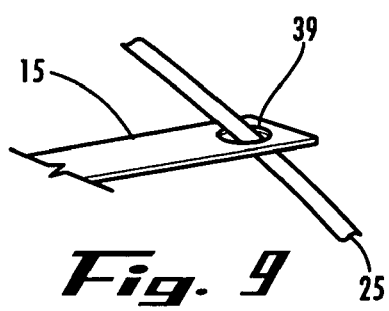
FIG. 9 illustrates a close view of an embodiment of the fastener element of the present invention.
Figure 10:
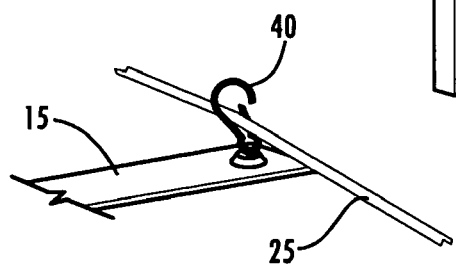
FIG. 10 illustrates a close view of an embodiment of the fastener element of the present invention.

FIGS. 9 and 10, illustrate variations of the fasteners 17 that can be used in lieu of a lip on the end of the rigid arm 15. FIG. 9 illustrates a hole 39 at the end of the rigid arm 15 through which a retainer 25 could be run. FIG. 10 illustrates a spring clip 40 on the end of the rigid arm 15, into which a retainer 25 could be inserted to fasten the rigid arm 15.

While the present invention is optimally designed for use with planed lumber or similarly smooth cargos, which are among the more difficult types of cargos to control in transit, transporters of other non-fluid cargos (plastic or PVC pipe segments, for example) can also take advantage of the invention. While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A device to secure cargo within the cargo area of a transport vehicle, comprising:
   (a) a rigid plate;
   (b) at least one bracing member to extend between the rigid plate and points substantially fixed relative to the vehicle; and
   (c) at least one rigid arm to extend from an upper portion of the rigid plate across the top of at least a portion of the cargo, said arm configured to be engageable with at least one retainer, wherein the retainer is attachable on each side of the vehicle.

2. A device as described in claim 1 wherein the bracing member is a rigid leg.

3. A device as described in claim 1 wherein the bracing member is a strut.

4. A device as described in claim 3 wherein the rigid plate is configured to rest on a generally flat surface.

5. A device as described in claim 1 wherein the rigid arm is attached hingeably to the rigid plate.

6. A device as described in claim 1 wherein the rigid arm is securely and detachably engageable with the rigid plate.

7. A device as described in claim 1 wherein the rigid arm has a fastener configured to engage the retainer securely.

8. A device to secure cargo within the cargo area of a transport vehicle, comprising:
   (a) a rigid plate;
   (b) at least one bracing member to extend between the rigid plate and points substantially fixed relative to the vehicle;
   (c) at least one rigid arm to extend from an upper portion of the rigid plate across the top of at least a portion of the cargo, said arm configured to be engageable with at least one retainer, wherein the retainer is attachable securely to points generally fixed relative to the vehicle on each side of the cargo to be secured; and
   (d) wherein the rigid arm is attached hingeably to the rigid plate, and the rigid arm has a fastener configured to engage the retainer securely.

9. A device as described in claim 8 wherein the bracing member is a rigid strut.

10. A device as described in claim 9 wherein the rigid plate is configured to rest on a generally flat surface.

11. A device to secure cargo within the cargo area of a transport vehicle, comprising:
    (a) a rigid plate;
    (b) at least one bracing member to extend between the rigid plate and points substantially fixed relative to the vehicle, wherein the bracing member is a rigid leg;
    (c) at least one rigid arm to extend from an upper portion of the rigid plate across the top of at least a portion of the cargo, said arm configured to be engageable with at least one retainer, wherein the retainer is attachable securely to points generally fixed relative to the vehicle on each side of the cargo to be secured; and
    (d) wherein the rigid arm is securely and detachably engageable with the rigid plate, and the rigid arm has a fastener configured to engage the retainer securely.

12. A device to secure cargo within the cargo area of a transport vehicle, comprising:

(a) a rigid plate;
(b) at least one bracing member to extend between the rigid plate and points substantially fixed relative to the vehicle, wherein the bracing member is a strut;
(c) at least one rigid arm to extend from an upper portion of the rigid plate across the top of at least a portion of the cargo, said arm configured to be engageable with at least one retainer, wherein the retainer is attachable securely to points generally fixed relative to the vehicle on each side of the cargo to be secured;
(d) wherein the rigid arm is securely and detachably engageable with the rigid plate, and the rigid arm has a fastener configured to engage the retainer securely; and
(e) wherein the rigid plate is configured to rest on a generally flat surface.

13. A device to secure cargo within the cargo area of a transport vehicle, comprising:
(a) a rigid plate;
(b) at least one bracing member to extend between the rigid plate and points substantially fixed relative to the vehicle;
(c) at least one rigid arm to extend from an upper portion of the rigid plate across the top of at least a portion of the cargo, said arm configured to be engageable with at least one first retainer; and
(d) wherein the bracing member is constrainable by at least one second retainer.

14. A device as described in claim 13 wherein the bracing element is a rigid leg.

15. A device as described in claim 13 wherein the bracing element is a strut.

16. A device as described in claim 15 wherein the rigid plate is configured to rest on a generally flat surface.

17. A device as described in claim 15 wherein the rigid arm has a fastener configured to engage the retainer securely.

18. A device as described in claim 13 wherein the rigid arm is attached hingeably to the rigid plate.

19. A device as described in claim 18 wherein the rigid plate is configured to rest on a generally flat surface.

20. A device to secure cargo within the cargo area of a transport vehicle, comprising:
(a) a rigid plate;
(b) at least one bracing member to extend between the rigid plate and points substantially fixed relative to the vehicle, wherein the bracing member is a strut;
(c) at least one rigid arm to extend from an upper portion of the rigid plate across the top of at least a portion of the cargo, said arm configured to be engageable with at least one first retainer;
(d) wherein the rigid plate is configured to rest on a generally flat surface;
(e) wherein the first retainer is attachable securely to points generally fixed relative to the vehicle, said points being generally adjacent to or beyond the fastener of the extended rigid arm; and
(f) wherein the bracing member is constrainable by at least one second retainer.

21. A device to secure cargo within the cargo area of a transport vehicle, comprising:
(a) a rigid plate;
(b) at least one bracing member to extend between the rigid plate and points substantially fixed relative to the vehicle;
(c) at least one rigid arm to extend from an upper portion of the rigid plate across the top of at least a portion of the cargo, said arm configured to be engageable with at least one first retainer;
(d) wherein the rigid arm is attached hingeably to the rigid plate;
(e) wherein the first retainer is attachable securely to points generally fixed relative to the vehicle, said points being generally adjacent to or beyond the fastener of the extended rigid arm; and
(f) wherein the bracing member is constrainable by at least one second retainer.

22. A device to secure cargo within the cargo area of a transport vehicle, comprising:
(a) a rigid plate;
(b) at least one bracing member to extend between the rigid plate and points substantially fixed relative to the vehicle;
(c) at least one rigid arm to extend from an upper portion of the rigid plate across the top of at least a portion of the cargo, said arm configured to be engageable with at least one first retainer;
(d) wherein the rigid arm is securely and detachably engageable with the rigid plate;
(e) wherein the first retainer is attachable securely to points generally fixed relative to the vehicle, said points being generally adjacent to or beyond the fastener of the extended rigid arm; and
(f) wherein the bracing member is constrainable by at least one second retainer.

23. A device to secure cargo within the cargo area of a transport vehicle, comprising:
(a) a rigid plate;
(b) at least one bracing member to extend between the rigid plate and points substantially fixed relative to the vehicle;
(c) at least one rigid arm to extend from an upper portion of the rigid plate across the top of at least a portion of the cargo, said arm configured to be engageable with at least one first retainer;
(d) wherein the rigid arm has a fastener configured to engage the retainer securely;
(e) wherein the first retainer is attachable securely to points generally fixed relative to the vehicle, said points being generally adjacent to or beyond the fastener of the extended rigid arm; and
(f) wherein the bracing member is constrainable by at least one second retainer.

24. A device to secure cargo within the cargo area of a transport vehicle, comprising:
(a) a rigid plate;
(b) at least one bracing member to extend between the rigid plate and points substantially fixed relative to the vehicle wherein the bracing member is a rigid leg;
(c) at least one rigid arm to extend from an upper portion of the rigid plate across the top of at least a portion of the cargo, said arm configured to be engageable with at least one first retainer wherein the first retainer is attachable securely to points generally fixed relative to the vehicle on each side of the cargo to be secured;
(d) wherein the rigid arm is attached hingeably to the rigid plate, and the rigid arm has a fastener configured to engage the first retainer securely; and
(e) wherein the bracing member is constrainable by at least one second retainer.

25. A device to secure cargo within the cargo area of a transport vehicle, comprising:

(a) a rigid plate;
(b) at least one bracing member to extend between the rigid plate and points substantially fixed relative to the vehicle wherein the bracing member is a strut;
(c) at least one rigid arm to extend from an upper portion of the rigid plate across the top of at least a portion of the cargo, said arm configured to be engageable with at least one first retainer wherein the first retainer is attachable securely to points generally fixed relative to the vehicle on each side of the cargo to be secured; and
(d) wherein the rigid arm is attached hingeably to the rigid plate, and the rigid arm has a fastener configured to engage the first retainer securely; and
(e) wherein the bracing member is constrainable by at least one second retainer.

26. A device as described in claim 25 wherein the rigid plate is configured to rest generally on a flat surface.

* * * * *